United States Patent Office 3,453,509
Patented July 1, 1969

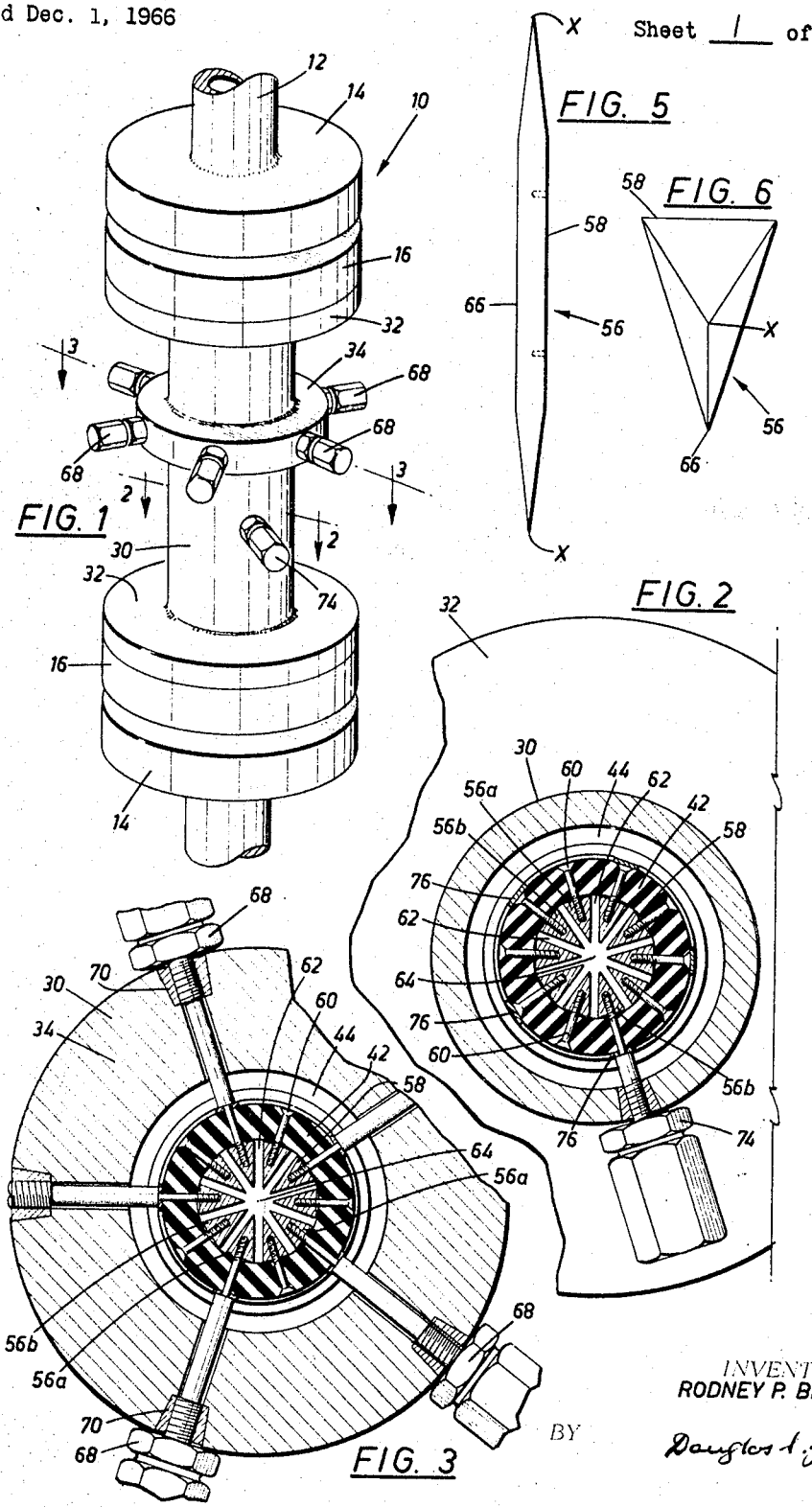

3,453,509
CAPACITANCE VOID METER
Rodney P. Bell, Eden Mills, Ontario, Canada, assignor to Delworth, Secord, Meagher and Associates, Toronto, Ontario, Canada
Filed Dec. 1, 1966, Ser. No. 598,481
Int. Cl. H01g 7/04, 7/06
U.S. Cl. 317—246     4 Claims

ABSTRACT OF THE DISCLOSURE

An instrument to measure the void fraction in a liquid-gas flow, specifically designed for high pressure steam. A series of equally spaced sectors arranged around the inside of a tube act as plates of a capacitor. The capacity change in the gauge is a linear function of the void fraction for all types of flow regimes.

BACKGROUND OF THE INVENTION

*Field of the invention*

This invention relates to meters for measurement of the ratio of phases in a two phase flow system and has particular reference to a capacitance type meter for measuring the amount of steam in a steam water mixture.

*Description of the prior art*

The accurate determination of the volumetric steam void fraction of water steam mixtures is essential in boiling water reactors since the quality of the steam emerging from the coolant tube is a significant parameter, providing a measure of the power generated within the reactor core.

A number of possible quality measurements techniques have been proposed based on the fact that the measurement of any property of a two phase that depends on the mixture density can be used to measure the mixture density and hence the void volume.

One of such properties is the dielectric constant of the mixture, the capacitance void fraction measurement concept for a two phase flow system being based on the fact that the dielectric constant of each phase is different. Hence, if the two phase mixture flows between the plates of a condenser the capacitance will be some function of the rates in which the phases are present.

From the practical aspect a meter or gauge constructed on this concept should fulfill certain requirements if it is to satisfactorily measure the steam void fraction of water steam mixture in boiling water reactors. For instance, the gauge should fit easily onto a reactor coolant tube and should not generate a large pressure drop in the tube.

Furthermore, the capacity change in the gauge should be a linear function of the steam void fraction; however, it has been found with a gauge having coaxial plates or electrodes that an approximate linear relationship only exists if the flow of the phases is homogenized. If the flow pattern through the coolant tube changes to a predominantly annular flow, i.e., water on the outside and steam on the inside, the calibration effected under homogenized flow no longer applies and an erroneous indication of the steam void function will be indicated.

It is an object of the invention to provide a void fraction capacitance gauge in which the capacity change with void fraction changes will be independent of the flow patterns of the two phase mixture.

It is a further object of the invention to provide a void fraction capacitance gauge in which the capacity change is a linear function of the void fraction within the gauge for all types of flow patterns at any void fraction level.

SUMMARY

The invention consists in constructing the plates or electrodes of a capacitance gauge in the form of sectors surrounding a central aperture, with the parallel surfaces of adjacent sectors forming radial channels from the central aperture; the capacitance of the two phase mixture in a radial channel is measured to determine the void fraction. Preferably to avoid changes in void fraction between the gauge and the normal pipe the combined cross sectional area of the central aperture and the radial channels is substantially equal to the cross sectional area of the coolant tube from which the two phase mixture is supplied to the gauge, the central aperture being 10% or less of the total area.

BRIEF DESCRIPTION OF THE DRAWING

The invention will now be described in relation to the accompanying drawings in which:

FIGURE 1 is a general perspective view of the gauge;

FIGURE 2 is a cross section taken on the lines 2—2 of FIGURE 1;

FIGURE 3 is a cross section taken on the lines 3—3 of FIGURE 1;

FIGURE 5 is a plan view of one of the sector electrodes of the gauge;

FIGURE 6 is an end view of one of the sector electrodes;

DESCRIPTION OF THE PREFERRED EMBODIMENT

Figure 4:
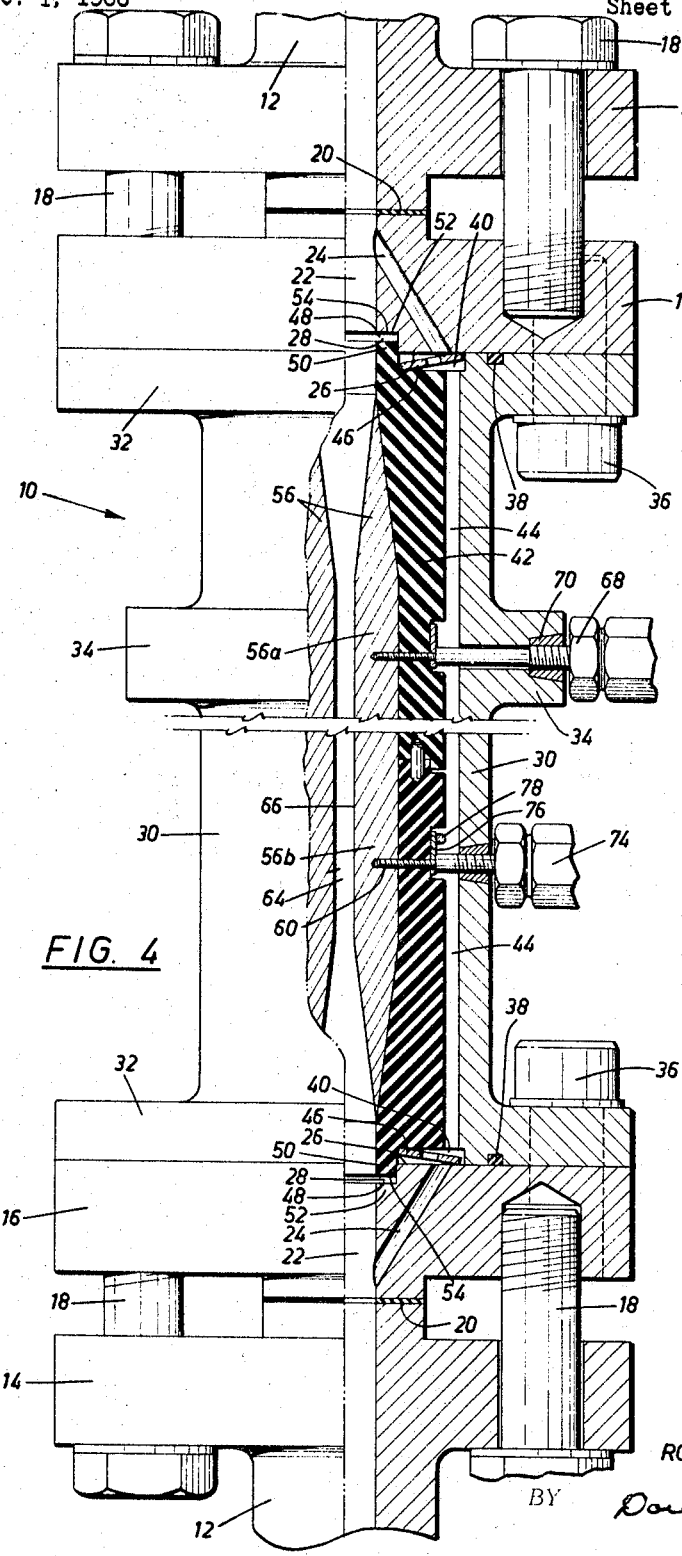
FIGURE 4 is a side elevational view in section of the gauge, the upper half being a sector displaced from the lower half.

With reference to the accompanying drawings, more particularly to FIGURE 1, the void fraction gauge, generally denoted by the numeral 10, is shown as installed into a reactor cooling tube 12 having conventional flanges 14. The gauge 10 includes a pair of opposed end spacers 16 each secured to an individual flange 14 by means of bolts 18. Inserts 20 provide a suitable high temperature seal between each flange 14 and its attached spacer 16.

Each spacer 16 has a central bore 22 which is the same diameter as that of the reactor coolant tube 12. A pair of diametrically opposed chanels 24, the purpose of which is explained below, are provided in each spacer 16, the channels 24 running obliquely from the bore 22 to merge on the inward face 26 of each spacer 16. A recess 28 is formed on the face 26 of each spacer 16 adjacent the bore 22.

The gauge 10 also includes an open ended housing 30 having opposed end flanges 32 and an intermediate flange 34. The housing 30 is preferably made of stainless steel and is held in position by screws 36 connecting each flange 32 to the adjacent spacer 16 with O-rings 38 providing a suitable seal. The end flanges 32 of the housing 30 are recessed as at 40 for reasons explained below.

A hollow open-ended non-conductive sector holder 42 is located in the housing 30. Apart from being nonconductive it is a preferred requirement of the material forming the sector holder 42 that it is unaffected by the higher temperatures attained by steam water mixtures and should possess freedom from corrosion in this medium; a material found suitable is boron nitride, but to prevent stresses due to its different co-efficient of expansion as compared with the surrounding housing 30 which is made of stainless steel, the sector holder 42 is spaced from the housing 30 thus providing a circumferential space 44. To balance the pressure on both sides of the sector holder 42 the oblique channels 24 are arranged to communicate with the space 44, the oblique channels 24 permitting passage of the fluid medium around the outer surface of the sector holder 42.

The sector holder 42 is maintained in place in the housing 30 by means of disc springs 46 located in the recess 40 and an aligned recess 48 which spaces the end of the sector holder 42 from the face 26 of the adjoining spacer 16. The recess 48 allows for the difference in expansion between the end of the sector holder 42 and the adjoining spacer 16. The flange 50 formed on the end of the sector holder 42 by the recess 48 rests against the shoulder 52 formed by the recess 28 in the spacer 16 and again for the purpose of preventing expansion interference the flange 50 of the sector holder 42 terminates short of the face 54 of the recess 28 in the spacer 16.

As shown in FIGURES 2 and 3 the gauge 10 has a plurality of sector capacitances alternately denoted 56a and 56b for purposes of later explaining their function, but all of identical configuration and formed of a conducting material such as stainless steel. The main portion of each sector 56a and 56b is of substantially triangular cross section with one wall 58 secured to the sector holder 42 by means of flat head screws 60. The opposed ends of each sector 56a and 56b are faired to a point X as shown in FIGURE 6; the end portions of the sector holder 42 are inclined inwards to correspond to the tapering of the back wall 58 of each sector 56a and 56b thus providing the requisite support.

As illustrated more particularly in FIGURES 2 and 3 the sectors 56a and 56b are so dimensioned and positioned in the housing 30 to provide between each adjacent pair a radial parallel walled channel 62. A central aperture 64 is defined by the edge 66 of each of the sectors 56a and 56b, the radial channel 62 communicating with the central aperture 64. In the preferred embodiment the central cross sectional area of all the radial channels 62 and the central apertures 64 is substantially the same as the cross sectional area of the reactor coolant tube 12; hence the housing 30 is of a greater diameter than the coolant tube 12.

With this configuration of radial channels 62 formed between adjacent sectors of substantially triangular cross section with the opposed walls of adjacent sectors being substantially parallel, it has been found that if annular flow conditions are set up in the reactor cooling tube 12 then such flow will be diverted between the sectors 56a and 56b into the radial channels 62 and will remain close to the outer radius. Hence, if a measurement of the capacitance is taken across any radial channel 62 between a pair of adjacent sectors 56a and 56b the full cross sectional area of the gauge 10 occupied by the two phase medium will be normal to the dielectric stress and the void fraction will be approximately same function of capacity as it is for homogenized flow.

The measurement of the dielectric may be determined across any radial channel 62 between two adjacent sectors 56a and 56b in the usual way by balancing against a known capacity in a capacitance bridge arrangement. To effect connections for such measurement one of the sectors 56a has a conductor, generally denoted by the numeral 68, see FIGURE 4, which is formed of a rod of nickel plated copper, one end of which is threaded through the sector holder 42 into the sector 56a; the other end of the nickel plated copper conductor 68 passes through the housing 30, being held in a sealing gland 70 to terminate in a head.

One of the immediately adjacent sectors 56b has a similarly constructed conductor, denoted by the numeral 74, the projecting end of which serves as a ground.

However, the measurement of the dielectric may also be made by error calculation explained hereunder and to effect such measurement alternate sectors 56a have conductors 68, see FIGURE 3. The strengthening of the housing 30 by the intermediate flange 34 provides the requisite support for the plurality of conductors 68. The remaining sectors 56b other than the one already described as having a conductor denoted by the numeral 74 are each supplied with a plate 76 which is attached to the head of the retaining screws 60 which secure the sectors 56b to the sector holder 42. It is arranged that these screws 60 should lie in the same plane as the ground conductor 74 and these sectors 56b are connected thereto by means of a ring 78 which contacts each plate 76, see FIGURE 1.

In the above arrangement with a gauge 10 having ten sectors the ones denoted by the numeral 56b are connected to a common ground 74 and the remainder, denoted by the numeral 56a, have individual conductors 68 which can be used to calibrate at 20% void intervals.

The method of calibration using an error signal involves the use of an identical pair of gauges 10 representing 20% of the capacitance bridge load. One gauge 10 is used for the measurement of the void fraction and the other gauge 10 being used as a phase having a zero void fraction; the bridge error signal is shown on a conventional chart recorder and to calibrate the following procedure is used:

Water is circulated so that both gauges 10 are filled and the 20% point is then fixed by switching out one sector 56a in each gauge 10. As a result the capacitance bridge should have zero error signal under this condition and the end points on the scale are then fixed by just switching in one of the sectors 56a on the measuring gauge 10. The chart is then adjusted to read zero void fraction and the 40% void fraction point is checked by switching out two sectors 56a of the measuring gauge 10; the calibration is effected in this manner over the whole range.

The number of sectors 56a and 56b in the gauge 10 may be varied depending on the size of the supply tube, but the disposition is always such that a plurality of radially disposed parallel walled channels 62 are provided, each communicating with a common central aperture 64.

While certain embodiments have been illustrated and described for the purpose of disclosure, it will be understood that the invention is not limited thereto, but contemplates such modifications and other embodiments as may be utilized without departing from the invention.

I claim:

1. A capacitance void meter consisting of a housing enclosing a plurality of sectors, the tips of said sectors defining a central aperture in said housing, with each adjacent pair of said sectors defining a parallel wall channel communicating with said aperture, a supply tube connected to said housing, said supply tube delivering a two-phased mixture into said aperture and each said parallel wall channel, a non-conductive holder in said housing, said sectors being supported thereon, said non-conductive holder being spaced from said housing to provide a circumferential channel.

2. A capacitance void meter according to claim 1, wherein said two-phased mixture is supplied to said circumferential channel.

3. A capacitance void meter consisting of a housing enclosing a plurality of sectors, the tips of said sectors defining a central aperture in said housing, with each adjacent pair of said sectors defining a parallel wall channel communicating with said aperture, a supply tube connected to said housing, said supply tube delivering a two-phased mixture into said aperture and each said parallel wall channel, and wherein alternative sectors are grounded, the remaining sectors being individually secured to a connector insulated from said housing and extending outwardly therefrom.

4. A capacitance void meter according to claim 3, wherein said alternate sectors are grounded by means of a common connecting ring, said connecting ring being secured to a ground screw located in said housing.

References Cited

UNITED STATES PATENTS 2,728,035  12/1955  Meredith _____ 317—246
3,279,253  10/1966  Blackmon _____ 317—246 X

OTHER REFERENCES

The Condensed Chemical Dictionary, sixth edition, 1961, Reinhold, N.Y., p. 166.

E. A. GOLDBERG, *Primary Examiner.*

U.S. Cl. X.R.

73—53